United States Patent Office 3,629,118
Patented Dec. 21, 1971

3,629,118
FERRITE POWDER AND METHOD
OF PREPARING IT
Morris D. Isserlis, Mountainside, N.J.
(P.O. Box 1364, Edison, N.J. 08817)
Filed May 5, 1969, Ser. No. 821,892
Int. Cl. H01j 1/11, 1/113
U.S. Cl. 252—62.54      4 Claims

ABSTRACT OF THE DISCLOSURE

A ferrite powder is prepared so that it comprises oriented agglomerates of ferrite particles or domains. The desired result is achieved by processing the materials used in making the powder in a magnetic field at a selected time in the manufacturing process.

BACKGROUND OF THE INVENTION

Magnets can be manufacured in various ways including a process in which the ferrite material is pressed dry in the desired magnet shape. Such a process is desirable because it is fast, relatively easy to carry out, and it reduces the cost of the finished magnet. However, known methods of dry pressing using presently available ferrite powders produce relatively inferior magnets.

DESCRIPTION OF THE PREFERRED EMBODIMENT

The principles of the invention may be practiced with any of the many well known materials used for making permanent magnets, and the following description of the methods of the invention is simplified by the omission of some details as to materials, temperatures, etc., where such process details would be well known to, or readily determined by, those skilled in the art.

According to the method of the invention, the desired materials are prepared as an intimate mix and calcined in know fashion to achieve the desired ferrite characteristics and crystal size. As an example, the mix may include barium carbonate and iron oxide. After the calcining operation, which is carried out at about 1650° to 2300° F., depending on the materials used and the desired characteristics to be achieved, the ferrite material is mixed with a binder, such as polyvinyl alcohol, and it is ground wet to a particle size in the range of 1 to 5 microns. Next, the ferrite material is dried and simultaneously magnetically oriented. In one method, this drying and orienting operation is achieved by placing the material in a pressure filter in which the liquid content is removed, and during this operation, a D.C. electric field is applied to the ferrite material to magnetically orient the particles or crystals.

Figure 1:
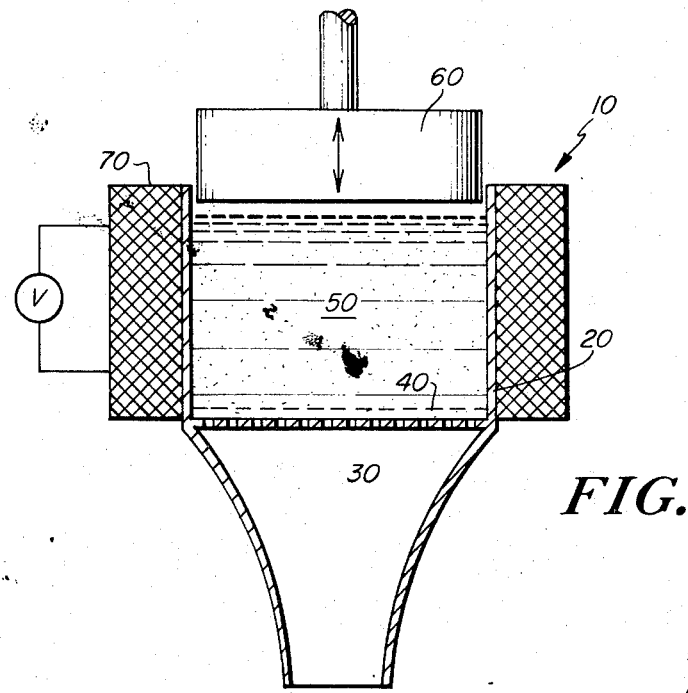
FIG. 1 is a schematic representation of apparatus used in practicing the invention.

A typical pressure filter 10 is shown schematically in FIG. 1 and includes a chamber 20 having a horizontal apertured plate 30 on which is seated a screen 40. The space 50 above the plate 30 and screen 40 comprises a reservoir into which the ground ferrite material, containing liquid to be removed, is introduced. A pressure plunger 60 is provided for applying pressure to the wet material introduced into the reservoir to remove the liquid therefrom. A magnetizing coil 70 is provided surrounding this entire reservoir portion 50 which is adapted to receive the wet ferrite material, and the coil is connected to a suitable D.C. power source V.

The wet ground ferrite material is introduced into the reservoir 50 of the filter 20, and pressure is applied thereto with the plunger 60. Simultaneously, the coil 70 is energized to magnetically orient the ferrite particles. The foregoing operation produces a cake of ferrite material which is demagnetized, for example, by reversal of the D.C. field in the coil 70, while the ferrite cake is still in the reservoir and seated on the screen 40.

Next, the ferrite cake is removed from the filter 20, and it is baked to achieve complete drying. This operation is carried out at a temperature which will not decompose or otherwise adversely affect the binder, and, for polyvinyl alcohol binder, this temperature is about 250° F.

Finally, the dried cake is ground to produce a ferrite powder comprising free-flowing oriented agglomerates of ferrite particles of about domain or single crystal size in which all of the ferrite particles or crystals are oriented. The binder assists in maintaining the oriented state. In the ferrite powder, the agglomerates may be up to 100 microns in size, and the particles or single crystals therein are about 1 to 5 microns in size. This powder can be used with ease and in a clean, fast, inexpensive process to produce magnets by pressing the ferrite powder dry in a magnetic field and without requiring expedients such as an A.C. field to maintain the ferrite powder free-flowing and orientable during the magnet-making process.

The foregoing process may also be practiced without the polyvinyl alcohol binder added to the ferrite material.

Figure 2:
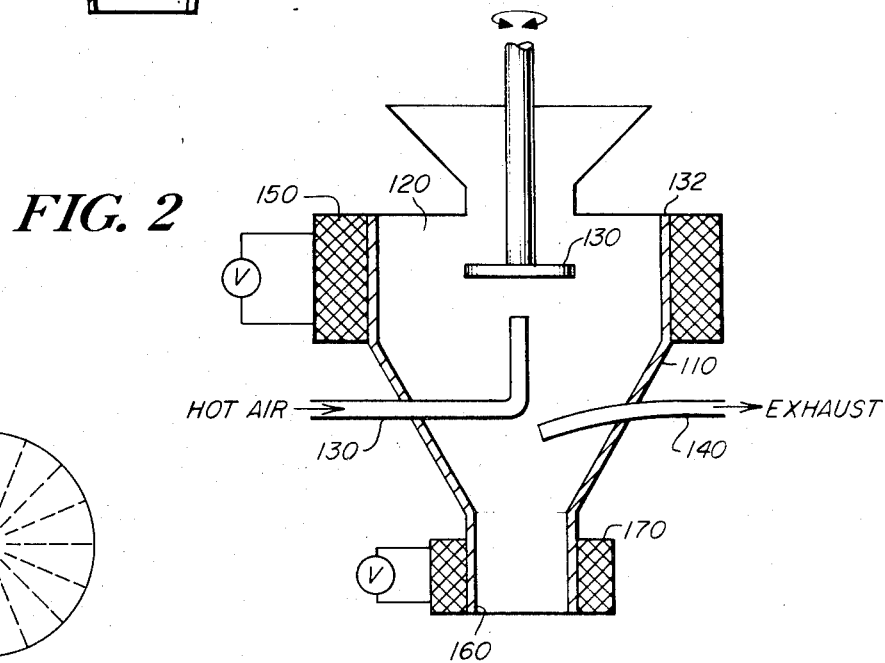
FIG. 2 is a schematic representation of another type of apparatus which can be used in practicing the invention.

In a modification of the invention, the first two steps of calcining and grinding are carried out as described above. Then, according to the invention, the ground material containing binder is spray dried in a magnetic field to produce oriented, free-flowing agglomerates of ferrite crystals. A typical spray dryer 110 shown schematically in FIG. 2 comprises a generally conical chamber 110 having an upper opening 120 into which the material to be dried is fed onto a rotating disk 130. The disk 130 is oriented horizontally inside the chamber 110 near its upper end 132. When the ferrite material strikes the rotating disk 120, it is turned into a spray which is driven by centrifugal force to the periphery of the chamber. Means such as inlet and outlet pipes 130 and 140, respectively, are provided for introducing hot air and removing it, as is well known in the art, to carry out the drying operation. The flow of hot air dries the ferrite material.

According to the invention, a magnetizing coil 150 is provided about the upper end 132 of the spray dryer where the ferrite material is introduced and where the drying takes place so that, as the ferrite particles fly about and dry, they are magnetically oriented. Again, free-flowing oriented agglomerates of single crystals are taken from the outlet 160 of the spray dryer. At this time, the ferrite powder is demagnetized, for example, by means of an A.C. field generated by a coil 170 placed about the outlet 160 of the spray dryer 20 so that it demagnetizes the powder as it passes through the outlet.

As above, the ferrite powder taken from the spray dryer comprises free-flowing oriented agglomerates of ferrite crystals, and the powder can be readily pressed dry in a magnetic field to produce superior magnets. As above, the binder can be omitted from the last-described process.

Ferrite materials prepared according to the invention are found to have an energy product of about 3.5 million gauss-oersteds, as compared to prior art dry-pressed materials which have an energy product of about 2 to 3 million. For example, a typical 10 gram prior art magnet can pull a mass of 200 grams with an energy product of $1\times10^6$ gauss-oersteds, whereas the same type of magnet made with the powder of the invention can pull a mass of 1000 grams.

Figure 3:
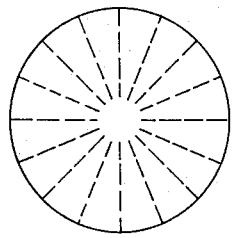
FIG. 3 is a representation of a ferrite agglomerate of the prior art.
Figure 4:
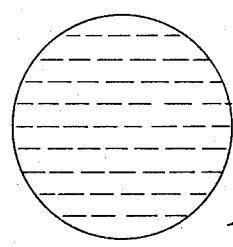
FIG. 4 is a representation of a ferrite agglomerate made in accordance with the invention.

The theory of the invention is illustrated in FIGS 3 and 4. In FIG. 3, is shown an agglomerate of unoriented ferrite material of the prior art. In such an agglomerate, the ferrite crystals position themselves in a disoriented generally circular array, and this accounts for the relative weakness of magnets made with this material. An agglomerate of the invention is shown in FIG. 4, and here the particles are all oriented parallel to each other. This material itself represents a strong magnet, and the agglomerates can be easily pressed dry and oriented to form magnets which are considerably stronger than those obtainable with the prior art material of FIG. 3. The agglomerates of FIG. 4 also appear to be able to move with minimum friction with respect to each other to become oriented during dry pressing. The efficacy of the ferrite powder of the invention is enhanced when a binder is included with the ferrite crystals making up the agglomerates.

What is claimed is:

1. Method of making an oriented ferrite powder comprising the steps of:

calcining a mixture of materials suitable for producing a ferrite powder, wet grinding the calcined material to form particles thereof in generally single crystal configuration, and subjecting the ground material, while wet, to a spray drying operation and simultaneously applying a magnetic field to said ground material, while still wet and while drying, to magnetically orient said particles and to thereby form free-flowing small agglomerates of ferrite particles, each of which is made up of a number of magnetically oriented ferrite particles.

2. The method defined in claim 1 and adding a binder to the calcined material during said grinding step.

3. The method defined in claim 1 and including, following the steps set forth, the step of demagnetizing the oriented ferrite material.

4. The method defined in claim 1 wherein said drying operation is performed by converting said ferrite material into a spray and simultaneously applying heat thereto.

References Cited

UNITED STATES PATENTS

| | | | |
|---|---|---|---|
| 3,026,215 | 3/1962 | Fukada et al. | 117—93 |
| 3,067,140 | 12/1962 | Davis | 252—62.5 |
| 3,189,667 | 6/1965 | Buttner et al. | 264—24 |
| 3,371,044 | 2/1968 | Cochardt | 252—62.54 |

OTHER REFERENCES

Kirk-Othmer Encyclopedia of Chemical Technology, Interscience Publishers, New York, N.Y., 1965, Vol. 8, p. 895-7.

Motyl, Western Electric Engineer, Vol. 7, July 1963, p. 3-10.

TOBIAS E. LEVOW, Primary Examiner

A. P. DEMERS, Assistant Examiner

U.S. Cl. X.R.

148—103; 252—62.63